B. NAUCKHOFF.
AUTOMOBILE CURTAIN WINDOW.
APPLICATION FILED APR. 7, 1919.
1,355,247.
Patented Oct. 12, 1920.
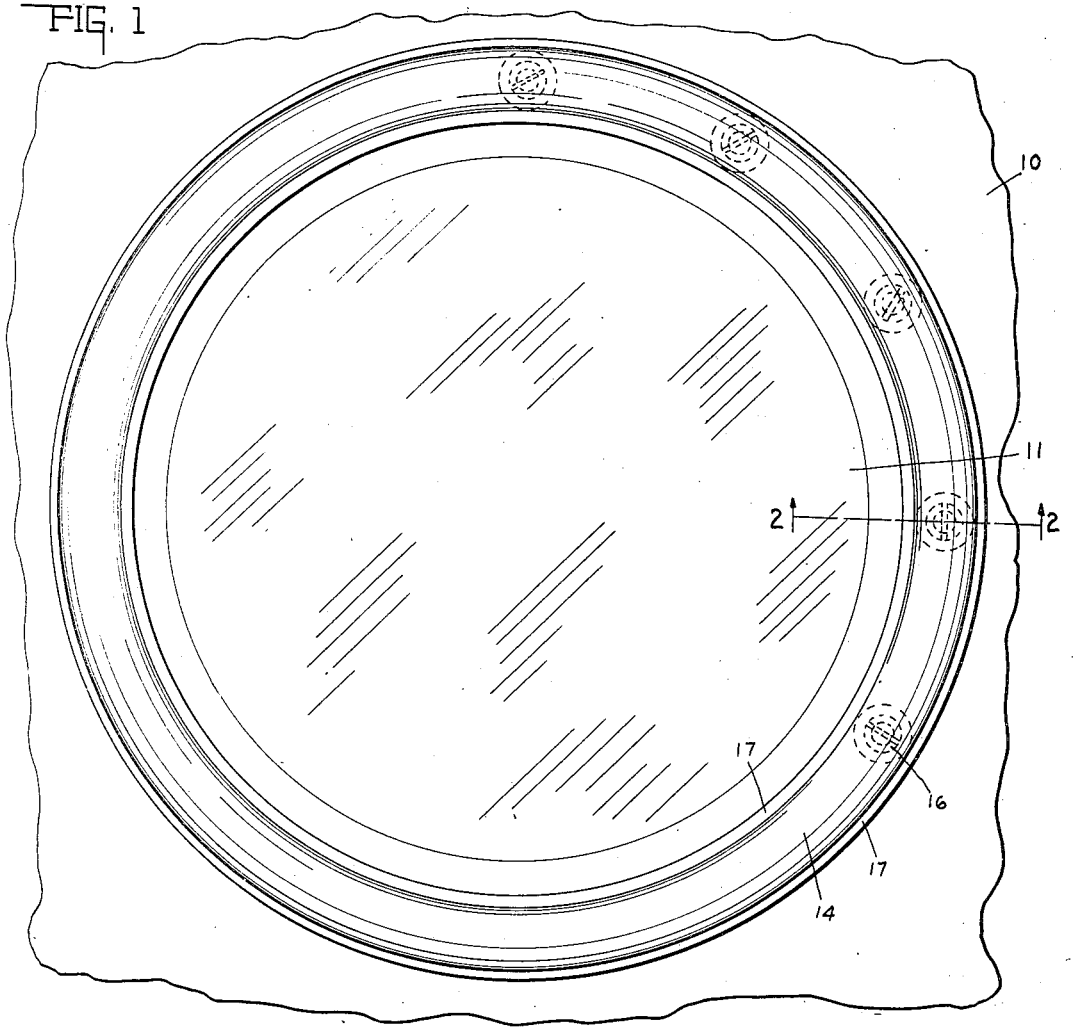
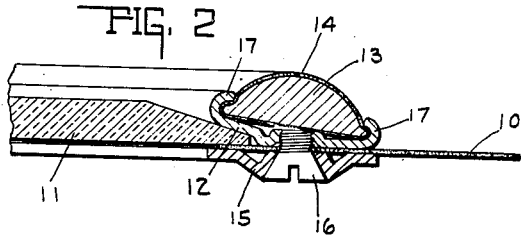
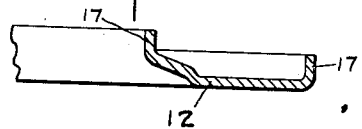
INVENTOR.
BIRGER NAUCKHOFF.
BY
ATTORNEYS

UNITED STATES PATENT OFFICE.

BIRGER NAUCKHOFF, OF INDIANAPOLIS, INDIANA, ASSIGNOR TO ZENITE METAL COMPANY, OF INDIANAPOLIS, INDIANA.

AUTOMOBILE-CURTAIN WINDOW.

1,355,247. Specification of Letters Patent. Patented Oct. 12, 1920.

Application filed April 7, 1919. Serial No. 288,143.

*To all whom it may concern:*

Be it known that I, BIRGER NAUCKHOFF, a subject of the King of Sweden, and a resident of Indianapolis, county of Marion, and State of Indiana, have invented a certain new and useful Automobile-Curtain Window; and I do hereby declare that the following is a full, clear, and exact description thereof, reference being had to the accompanying drawings, in which like numerals refer to like parts.

This invention relates to the construction of windows for automobile curtains, tops and the like. The main object of the invention is to provide a means for securing a glass window firmly to the material forming the curtain or back of the top so as to give it a finished appearance. Another feature of the invention is to construct the securing means above mentioned in the most economical and simple manner, so as to decrease the cost of production.

Still another feature of the invention is the use of a filler or rim which is trimmed in the same material used in the curtain, and a single shell for clamping the curtain material and filler or rim in position, and at the same time acting as one of the clamping members for securing the glass to the curtain.

In the accompanying drawings which are made a part of this application Figure 1 is a front elevation showing the window secured within the curtain. Fig. 2 is an enlarged view of a section taken on the line 2—2 of Fig. 1. Fig. 3 is a perspective view of the clamping shell before being formed in clamping position.

In the drawings there is shown an automobile curtain 10 having a glass window 11 secured therein. The clamping shell 12 is formed with a groove as shown in Fig. 3 by a simple stamping process, and then placed in position as shown in Fig. 2 so as to engage the outer beveled edge of the window glass with its inner side.

A filler 13 formed of wood or any other suitable material, acting as the frame or finishing molding of the window is placed in the clamping shell, and a strip of flexible curtain material 14, and if preferred said material may be similar to the curtain 10, drawn around the rounded or outer surface of the filler frame. The flanged edges 17 of the clamping shell are then bent inwardly so as to clamp the material 14 and the filler in place. A metal clamping ring 15 is then placed on the opposite or back side of the curtain and secured to the clamping shell 12 by the screws 16 so as to securely clamp said shell and ring together and form a groove within which the window glass is seatable and by which the curtain material 10 is firmly secured therebetween. By means of this construction any type or form of filler may be used, or a variety of finishing material 14, whereby the appearance of the mounting may be made to suit the user.

The invention claimed is:

1. The combination with a flexible support having an opening therein, and a transparent section closing said opening, of a frame for securing said section in said support including a clamping member having outwardly turned flanges and adapted to engage one side of said transparent section and flexible support, a ring mounted on the opposite side thereof, a filler adjacent said clamping member, flexible material fitted over the outer surface of said filler and simultaneously secured together and to said clamping member by said flanges, and means for securing said clamping member and ring together whereby said transparent section will be fixed in said opening.

2. The combination with a curtain having an opening therein, and a window pane closing said opening, of a frame for securing said pane in said curtain including a clamping member having outwardly turned flanges, the inner side of said member being slightly offset to allow for the thickness of said window pane, said member being adapted to engage one side of said window pane and curtain, a ring mounted on the opposite side thereof so as to be adjacent said clamping member, a filler adjacent the clamping member, flexible material fitted over the outer surface of said filler, said filler and flexible material being simultaneously secured to said clamping member by said flanges, and means securing said clamping member and ring together whereby said window pane will be fixed within the opening of said curtain.

In witness whereof I have hereunto affixed my signature.

BIRGER NAUCKHOFF,